July 21, 1931.  H. D. McMURRAY  1,815,656
VEHICLE BODY TRUNK
Filed July 19, 1929  2 Sheets-Sheet 1
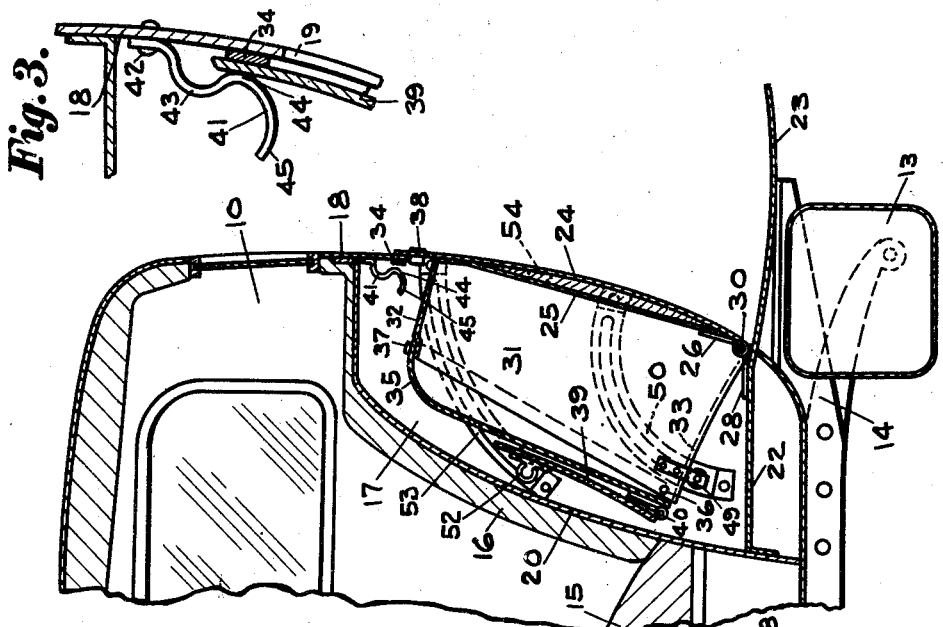
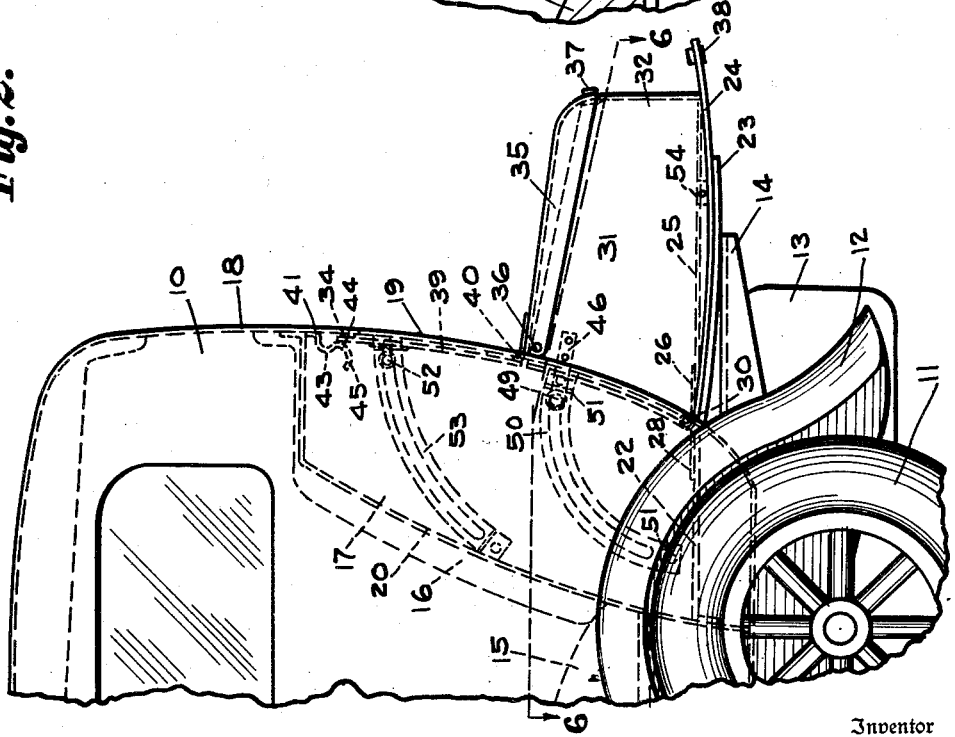
Inventor
H. D. McMurray
By Arthur H. Sturges
Attorney July 21, 1931.  H. D. McMURRAY  1,815,656
VEHICLE BODY TRUNK
Filed July 19, 1929    2 Sheets-Sheet 2
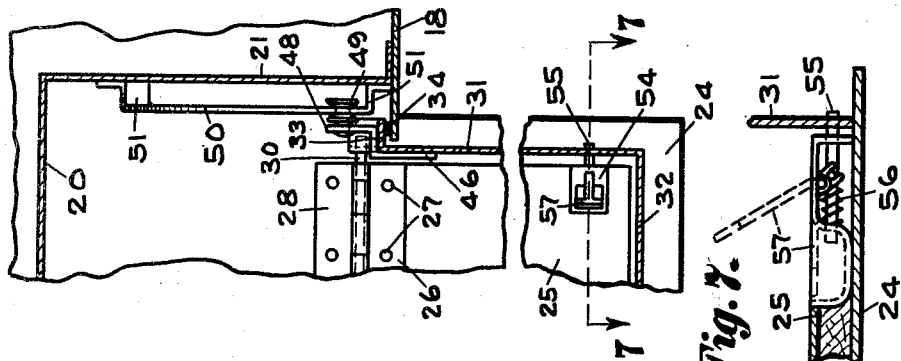
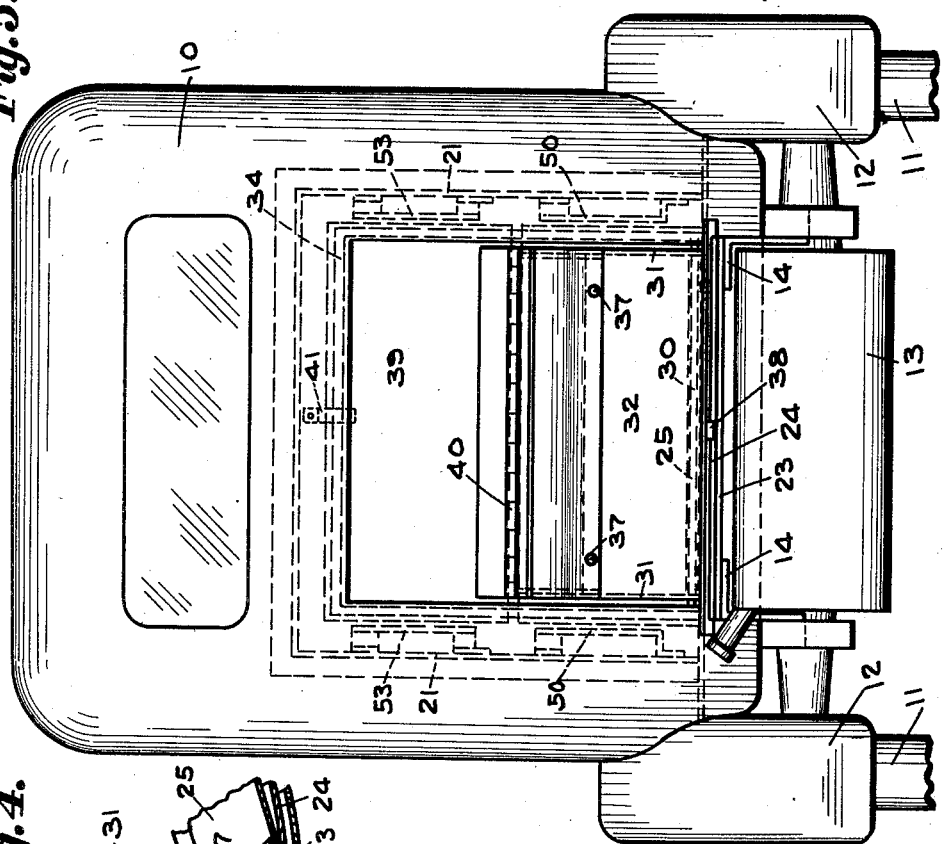
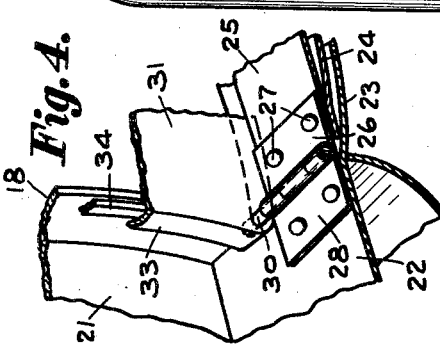
Inventor
H. D. McMurray
By Arthur H. Sturges.
Attorney Patented July 21, 1931

1,815,656

UNITED STATES PATENT OFFICE

HARRIE D. McMURRAY, OF SIOUX CITY, IOWA

VEHICLE BODY TRUNK

Application filed July 19, 1929. Serial No. 379,432.

The present invention relates to improvements in vehicle trunks, and more particularly relates to a vehicle trunk and cooperating body construction in which the trunk is disappearing and is adapted to be wholly concealed within the body of the vehicle except at such times as it is folded out for use.

An object of the invention is to provide for a disappearing trunk whereby the body of the automobile will assume a normal appearance when the trunk is stored away.

Another object of the invention is to provide an improved cooperating body and trunk construction whereby the movement of the trunk into and out of the body compartment will be facilitated.

A further object of the invention is to provide an improved trunk construction in cooperation with a body compartment, whereby during periods of disuse, the body will present the ordinary conventional appearance; and when the trunk is used, the trunk compartment will be entirely closed to avoid the entrance of dust or other foreign matter.

A still further object of the invention is to provide an improved vehicle construction in which the waste space behind the rear back seat cushion is utilized to hold a trunk and in which provision is made for sustaining the trunk in an outwardly projected position of use without the necessity of the conventional trunk platform.

With the foregoing and other objects in view, the invention will be more fully described hereinafter, and will be more particularly pointed out in the claims appended hereto.

In the drawings, wherein like symbols refer to like or corresponding parts through the several views, Figure 1 is a fragmentary side elevation of a vehicle equipped with the improved trunk construction and with the trunk extended in a position of use.

Figure 2 is a vertical longitudinal fragmentary section of the same with the trunk folded into the body compartment.

Figure 3 is a fragmentary vertical sectional view taken on an enlarged scale through a portion of the body compartment and showing the cover and cooperating spring detent.

Figure 4 is a fragmentary perspective view taken on an enlarged scale with parts broken away and with parts shown in section and showing the hinge and adjacent construction.

Figure 5 is a rear view of the vehicle showing the trunk in the lowered position.

Figure 6 is a horizontal fragmentary sectional view taken on the line 6—6 in Figure 1, and Figure 7 is a cross section taken on the line 7—7 in Figure 6 and showing the flush locks employed.

Referring more particularly to the drawings 10 designates generally a vehicle body, such as the conventional body of the present type automobile. The wheels of the vehicle are indicated at 11, the fenders at 12, the gasoline or fuel tank at 13, and the trunk platform supporting brackets at 14. The rear seat is indicated at 15 and the back cushion for the rear seat at 16.

In accordance with the invention a compartment 17 is formed in rear of the back cushion 16. This compartment is normally a waste space between the cushion 16 and the rear wall 18 of the vehicle body through which the compartment 17 opens, the opening being indicated at 19. There is preferably a lining 20 of metal or other suitable material in the compartment, the side walls 21, shown in Figure 6 being a portion of this lining and extending from the forward portion 20 of the lining to the back wall 18 of the vehicle. A bottom 22 of sheet metal or other appropriate material of which automobile bodies are usually made extends across the lower portion of the compartment 17 between the walls 20 and 21 and to and through the opening 19 made in the rear wall 18 of the vehicle body, this bottom 22 being extended out sufficiently to form a platform 23 for the trunk, the platform resting upon the platform brackets or supports 14. This platform 23 may be of a slightly concave form as to its upper surface in order to conform to the convex character of the door 24 for the opening 19 of the compartment 17. This door 24 is adapted to swing down and rest upon the platform 23 as indicated in Figure 1, and it is convex in order to agree with the usual curvature ordinarily given to the rear wall of an automobile.

As shown in Figure 4 the door 24 fits at its lower end against the adjacent end portion of a trunk floor 25 which extends on the inner side of the door. Both the door and the trunk floor are secured to one leaf 26 of a hinge as by the use of the rivets 27 passing through both the trunk floor and the door. The other leaf 28 of the hinge is secured as by the rivets or other appropriate fastenings to the bottom 22 or to any other desired fixed part of the vehicle body. Still referring to Figure 4 the pintle 30 of the hinge is extended beyond the hinge leaves 26 and 28 and passes at both ends through the lower inner portions of the side walls 31 of the trunk frame. This trunk frame is substantially U-shaped including the two side walls 31 and the front wall 32. If desired a rear wall may also be secured across between the rear ends of the side walls 31 or this rear wall may be left out and the interior trunk space may communicate with the interior space of the compartment 17. As shown in Figure 4 the inner ends of the side walls 31 of the frame are formed with out-turned flanges 33 adapted to overlap the adjacent portions of the rear vehicle wall 18 extending about the opening 19 and the flanges 33 are so disposed with reference to weatherstrip 34 that the flanges will engage such weatherstripping when the trunk is in the outer position of use and thus form a tight joint for preventing the entrance of rain, sleet, snow, dust and other foreign matter.

A lid 35 is provided for the trunk, such lid being pivoted as at 36 to the upper inner corners of the side walls 31 and being secured at its free edges to the front wall 32 as by the use of one or more locks 37 as shown in Figure 5. A lock 38 is also provided upon the door 24 for the purpose of securing the door in the closed position.

A cover 39 is hinged at 40 to the hinged end of the trunk lid 35 and the same is adapted to fold against the lid in the inner position of the trunk as shown in Figure 2, but to open upwardly when the trunk is swung out to the position shown in Figure 1, whereby the cover 39 will extend in an upright position from the trunk lid and close the upper portion of the compartment opening 19 which would otherwise remain open and permit the entrance of dust, dirt, and the elements.

As shown more particularly in Figures 2 and 3, a spring detent 41 is riveted or otherwise secured to the vehicle body as indicated at 42 in the position where it will receive the upper free end of the cover 39 when the same assumes the upright position. This spring detent 41 is made of metal or some other material possessing inherent resiliency and the intermediate portion thereof is formed into a loop 43 for the purpose of developing this resiliency to a high degree and also for locating the convex cam portion 44 of the detent outwardly from the rear wall 18 of the vehicle body to provide a space between the dent and the body to receive the free edge of the cover 39 and of a weatherstrip 34.

The cam portion 44 of the spring is provided with an elongated nose 45 which is so situated as to engage the free edge portion of the cover 39 during the course of its upward movement, the cover prying the spring detent outwardly and the spring detent reacting on the cover to guide the same into the position shown in Figure 3 and to afterwards compress the cover against the rubber, felt, fiber or other weatherstrip 34.

As shown more particularly in Figure 6 arms 46 are secured to the inner edges of the side walls 31 of the trunk frame and these arms are formed with offset portions lying along the flanges 33 and the offset portions are formed with inwardly projecting parts 48 which carry grooved rollers 49 extending outwardly of the arms and engaged in grooved and curved tracks 50 made in metal or other members 51 which stand out from the side walls 21 of the compartment and are secured thereto in any appropriate manner.

The grooved rollers 49 are adapted to strike the end walls of the slot tracks 50 in the outermost position of the trunk, for instance as shown in Figure 1 in order to support the trunk where no trunk platform or support has been provided. In a similar way grooved rollers 52 are carried upon the cover 39 and they operate in grooved and curved tracks 53 secured also upon the side walls 21 of the compartment above the tracks 50 before mentioned. The purpose of the rollers 52 and cooperating tracks 53 are to guide the upper free end portions of the cover 39 into proximity to the spring detent and to secure a closing of the cover 39 when the trunk is pulled out.

The trunk floor 25, as shown in Figure 7 is provided with flush locks 54 or in other words lock casings are mounted flush within the trunk floor 25 and the bolts 55 of the locks are adapted to extend through openings in the side walls 31 of the trunk frame. Coil springs 56 are employed to normally project the latches 55 and levers 57 are carried by the locks for the purpose of moving the bolts 55 backwardly out of engagement with the walls 31.

In the use of the device, the bracket or supports 14 and the platform 23 may or may not be provided. In case such parts are present on the vehicle, the platform will serve to support the trunk in the outer position of use as shown in Figure 1. Where the vehicle is not equipped with any such parts 14 and 23, the trunk may be installed and held in the outer position by use of the rollers 49 cooperating with the track 50 as above explained.

Now the parts will normally occupy the position shown in Figure 2 in which the entire trunk assembly is concealed within the interior compartment 17 of the body and as the door 24 is locked, the contents are well guarded. Moreover, the trunk assembly in no wise detracts from the harmonious body lines given to the vehicle and there are no projecting parts beyond the rear of the vehicle body.

When the trunk is to be used the authorized owner of the car possessing the key of the door 24 may unlock the door and lower such door to the platform 23. It will be understood that the trunk floor 25 will be drawn down with the door 24 but the latches 54 may be normally disengaged from the trunk frame 31, 32 and consequently the trunk frame, which pivots independently of the trunk floor and door upon the pintle 30 of the hinge, may be drawn down subsequently. It will be understood that the latch bolts 55 will be initially retracted and only projected after the trunk frame is lowered upon the trunk floor or upon the door whereupon the trunk frame and the trunk floor are assembled for use. In the act of drawing down the trunk frame, the trunk lid 35 and the cover 39 will be moved therewith and the cover 39 will be opened outwardly and upwardly and will assume the substantially vertical position shown in Figures 1 and 5 whereby to close the upper portion of the compartment opening 19 above the trunk and the cover will be held in place by the spring detent 41 as above described. In this outer position the lid 35 of the trunk may be raised and suit or other cases may be placed in the trunk or clothing or other material may be directly placed in the same; after which the lid 35 is restored and locked and the parts may remain in the position shown in figure during the period of use of the trunk.

It will be understood that the rollers 49 and tracks 50 will be reinforced in their support of the trunk by the flanges 33 of the trunk frame. It will be appreciated from the foregoing that I have provided a simply constructed and inexpensive disappearing trunk for use in connection with the waste space of an automobile body for conserving the appearance of the vehicle and for providing a large storage space useful in traveling.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In combination a vehicle body, a vehicle body internal compartment, a door for the compartment hinged to the body, a trunk on the interior of the door and hinged therewith, and a cover carried by the trunk for closing the compartment above the trunk when the latter is swung out of said compartment.

2. In combination a vehicle body, a vehicle body internal compartment, a door hinged to the body for closing the compartment, a trunk floor hinged with the door, a trunk frame detachably coupled to the floor, a lid on the frame, and a cover on the lid for closing the upper portion of the compartment when the trunk is in operative position.

3. In a vehicle body having an internal compartment with an opening through the body, a trunk foldable into and out of the compartment, grooved rollers carried by said trunk, and tracks in the compartment for receiving and guiding the movement of said rollers.

4. In a vehicle body having a compartment opening through the body, a trunk foldable into and out of the compartment, a cover hinged to the trunk, grooved rollers carried by the cover, curved slotted tracks in the compartment for the rollers, and spring means to clamp and retain the cover in place across the compartment opening.

5. In a vehicle body having a compartment opening through the body and having walls adjacent the opening, a door hinged in the opening, a trunk floor hinged with the door, a U-shaped trunk frame pivoted independently of the floor and door and having flanges to take against said walls, a lid for the trunk pivoted to the frame, and catches on the floor for interlocking with the frame.

6. In a vehicle body having a compartment opening through the body, a trunk floor hinged in the opening, a trunk frame pivoted in the opening independently of the floor, and catches on the floor for interlocking with the frame.

7. In a vehicle body having a compartment opening through the body, a door for the compartment hinged to the body, a trunk on the interior of the door, and foldable into and out of the compartment, and a cover pivotally carried by the trunk and foldable thereagainst when the trunk is within the compartment and adapted to open upwardly and engage the body of the vehicle adjacent the opening when the trunk is swung out of the compartment whereby the upper portion of the compartment is closed.

In testimony whereof, I have affixed my signature.

HARRIE D. McMURRAY.